Patented July 15, 1941

2,249,583

UNITED STATES PATENT OFFICE 2,249,583

POLYMERIZATION OF HYDROCARBONS

Charles L. Thomas, Chicago, Ill., assignor to Universal Oil Products Company, Chicago, Ill., a corporation of Delaware No Drawing. Application November 30, 1938, Serial No. 243,262

8 Claims. (Cl. 196—10)

This invention relates to the polymerization of normally gaseous hydrocarbons such as those which are present in gases from cracking processes to produce relatively low molecular weight polymers which are more frequently used to increase the yield and antiknock value of motor fuels.

More specifically the invention involves polymerization of olefin hydrocarbons in the presence of specific types of catalytic materials which accelerate the desired reactions and which have no difficulty in being regenerated after contamination by high boiling polymers and gummy substances deposited over an extended period and produced incidentally to the polymerization reaction. The preferred catalysts are prepared synthetically by definite steps of procedure which are specific in the production of catalysts of high activity for prolonged use.

As a recent development, the petroleum industry has become familiar with a number of processes for converting refinery gases in part to polymers useful for increasing the antiknock value of motor fuels or the production of aviation fuels. Some of these processes are strictly thermal and employ selected time, temperature and pressure conditions which favor liquid-forming reactions. In other processes catalysts are employed which direct the course of true polymerization reactions in a more definite direction. In the thermal process, the reactions are not simple but involve decompositions and recombinations so that not only mono-olefins but gases and relatively high boiling liquids of a cylic character are also produced. The use of selected catalysts eliminates a majority of side reactions and produces simple mono-olefinic polymers of lower temperatures and generally lower pressures.

The catalysts employed thus far in polymerizing gaseous olefins are of a varied character, some containing mineral acids and salts of metals as their essential active ingredients, but many are characterized by sensitivity to poisoning influences, gradual contamination and loss of active ingredients by undesirable chemical reactions and difficulty in reactivation. The present process is a contribution to the art of catalytic polymerization which consists in providing improved catalysts which are of a definitely reproducible character, are highly refractory so that their essential characteristics are not changed under alternate conditions of service and reactivation, and are especially resistant to incidental poisoning influences so that their temporary loss in activity is due only to gradual deposition of undesirably heavy polymer products which can be removed, as for example, by solution effects or simple burning with air or oxygen-containing gas.

In one specific embodiment the present invention comprises a process for the polymerization of the normally gaseous olefins comprising propene and butenes present in other hydrocarbon gases for the production of liquid polymers having high antiknock value which consists in subjecting said olefin hydrocarbons at elevated temperatures and superatmospheric pressures to contact with solid catalytic material comprising silicia-alumina-zirconia masses produced by synthetic methods.

In a further embodiment the preferred catalyst may be employed to cause the polymerization of other olefins such as, for example, mono-olefins of higher molecular weight, di-olefins, etc., with or without the presence of propene and butenes or other hydrocarbon gases, for example.

According to the present invention the olefin-containing gases may be processed under polymerizing conditions in the presence of catalysts prepared by a number of alternative methods which have certain necessary features in common as will be subsequently described. Generally speaking the catalysts may be considered to comprise an intimate molecular admixture of silica, alumina and zirconia, all of the components of which indicate more or less low activity individually but in the aggregate display high activity. The activity is not an additive function, it being relatively constant for a wide range of proportions of the components whether in molecular, or fractions of molecular proportions. No one component can be determined as the one component for which the remaining components may be considered as the promoters according to conventional terminology, nor can any component be determined as the support and the others as the catalyst proper.

According to one general method of preparation used before drying treatment, the preferred catalyst may be prepared by precipitating silica from a solution as a gel and subsequently admixing or depositing the alumina and zirconia upon the hydrated silica. One of the more convenient methods of preparing the silica gel is to acidify an aqueous solution of sodium silicate by the addition of an acid such as hydrochloric acid, for example. The excess acid and the concentration of the solution in which the precipitation is brought about determine in some measure the suitability of the silica hydrogel for subsequent composition with alumina and zirconia. In general, suitable hydrated silica may be produced by the use of dilute solutions of sodium silicate and the addition of a moderate excess of acid whereby the desired active silica gel is obtained and conditions of filtering and washing are at an optimum.

After precipitating the silica it is treated and washed to substantially remove alkali metal ions. It is not known whether the alkali metal ions such as sodium ions are present in the primary gel in chemical combination or in an adsorbed state but it has been definitely determined that their removal is necessary if catalysts suitable for prolonged use in accelerating hydrocarbon conversion reactions are to be obtained. It is possible that the presence of the alkali metal impurities causes a sintering or fusion of the surfaces of the catalyst at elevated temperatures so that the porosity is much reduced with corresponding reduction in effective surface. Alkali metal ions may be removed by treating with solutions of acidic materials, ammonium salts generally, or salts of multivalent metals, more preferably those of aluminum and zirconium. When treating with acids, as for example, with hydrochloric acid, the acid extracts the alkali metal impurities in the silica gel. The salts formed and acid are then substantially removed by water washing treatment. Where ammonium salts or salts of multivalent metals are used, the ammonium or multivalent metals apparently displace the alkali metal impurities present in the composite and the alkali metal salts formed, together with the major portion of the multivalent salts, are removed in the water washing treatment. Some of the multivalent metals introduced into the silica hydrogel in the purifying treatment may become a permanent part of the composite, whereas, in the treatment with ammonium salts small amounts of ammonium salts remaining after the washing process will be driven off in subsequent treatment at elevated temperatures.

In one of the preferred methods of compositing the hydrated materials, the purified precipitated hydrated silica gel may be suspended in a solution of zirconium and aluminum salts in the desired proportions and zirconia and alumina deposited upon the suspended silica by the addition of volatile basic precipitants such as ammonium hydroxide, for example, or ammonium carbonate, ammonium hydrosulfide, ammonium sulfide or other volatile basic precipitants such as organic bases may be employed. According to this method, the purified silica gel may be suspended in a solution of zirconium and aluminum chloride, for example, and the hydrated zirconia and hydrated alumina precipitated by the addition of ammonium hydroxide. In this example, the alumina and zirconia were co-precipitated. Good results may be obtained by precipitating one of these components prior to the remaining component.

Alternately the purified hydrated silica gel may be mixed while in the wet condition with separately prepared hydrated alumina and hydrated zirconia precipitated either separately or concurrently as for example by the addition of volatile basic precipitants to solutions of salts of aluminum and zirconium. The hydrated alumina and hydrated zirconia thus prepared are substantially free from alkali metal ions and can be admixed with the purified silica gel. However, if alkali metal ions are incorporated as when the hydrated alumina is prepared from sodium aluminate, for example, or if zirconium tetrahydroxide is precipitated by the interaction of zirconium sulfate and alkali metal cyanides, or the inter-action of zirconium sulfate and sodium acetate or sodium hydroxide, regulated purification treatment and water washing by methods selected from those described in connection with the purification of the hydrated silica gel to remove alkali metal ions would be required. Care should be observed in the selection and concentration of reagents used so as not to dissolve unduly large amounts of alumina or zirconia. As further alternatives the purified silica gel may be added to a solution of salts of aluminum and zirconium, and hydrated alumina and hydrated zirconia deposited by hydrolysis with or without the use of heat, or the purified silica gel may be mixed with suitable amounts of salts of aluminum and zirconium as, for example, in forming a paste and heating whereby alumina and zirconia are deposited upon the silica gel as a result of the decomposition of the aluminum and zirconium salts.

In the methods above described a silica hydrogel free from alkali metal ions was admixed or had deposited thereon relatively pure hydrated alumina and hydrated zirconia prior to drying treatment. In methods described below the hydrated silica, hydrated alumina and hydrated zirconia are concurrently precipitated or admixed and treatment to remove alkali metal ions applied to the composited material prior to drying treatment either in presence of the original reactants or subsequent to water washing. Thus, solutions of silicon compounds more usually alkali metal silicates and soluble aluminum and zirconium salts may be mixed under regulated conditions of acidity or basicity to jointly precipitate hydrated silica, hydrated alumina, and hydrated zirconia in varying proportions. For example, solutions of sodium silicate, aluminum chloride and zirconyl chloride may be mixed and alkaline or acid reagents added according to the proportions used so that a pH of 3–10 is obtained. In cases where a sol is formed the precipitation may be brought about by addition of a volatile base as, for example, ammonium hydroxide and alkali metal salts removed by water washing, or the composite may be treated as indicated above in connection with the purification of the hydrated silica or other components to remove alkali metal ions. Various methods are possible for the preparation of the hydrated silica, hydrated alumina and hydrated zirconia separately or in combination and the purifying treatment is necessary where alkali metal ions are present in substantial amounts.

The character and efficiency of the ultimately prepared silica-alumina-zirconia catalyst will vary more or less with precipitation and/or mixing, purification treatment, ratio of components, calcining, etc., several specific examples being given. The ratio of the components may be varied within wide limits, the limiting factor appearing to be more in evidence with respect to small proportions than with larger proportions of the various components. In general it appears that two to six mol per cent of alumina and zirconia together with reference to silica may be considered an approximation of the minimum proportions. There is some evidence that synthetic catalysts comprising silica, alumina and zirconia are more stable for prolonged use than are silica-alumina catalysts.

After the alumina and zirconia has been mixed with, or deposited upon the purified hydrated silica gel and water washed if desired, as described for one general method of preparation, or after the hydrated silica, hydrated alumina and hydrated zirconia have been composited and treated to remove alkali metal ions, as described for another general method of preparation, the catalytic material may be recovered as a filter cake and dried at a temperature of the order of 240–300° F. more or less, after which it may be formed into particles of a suitable definite size ranging from powder to various formed sizes obtained by pressing and sizing or otherwise formed into desired shapes by compression or extrusion methods.

By calcining at temperatures of the order of approximately 850–1000° F. or higher, maximum activity of the catalyst is obtained and a further dehydration occurs so that for example after a considerable period of heating at 900° F., the water content as determined by analysis is of the order of 2–3% which is firmly fixed and does not appreciably vary either as the result of long service or a large number of reactivations at considerably higher temperatures.

Catalysts prepared by the various types of procedures outlined evidently possess a large total contact surface corresponding to a desirable porosity, the pores of the catalyst being of such size and shape that they do not become clogged with carbonaceous deposits after a long period of service, and are therefore not difficult to reactivate by oxidation. This structure is also retained after many alternate periods of use and reactivation as evidenced by the fact that the catalyst may be repeatedly reactivated by passing air or other oxidizing gas over the spent particles to burn off deposits of carbonaceous material at temperatures above 800° F., temperatures as high as 1400–1600° F. having been reached without apparently affecting thme catalytic activity.

In polymerizing normally gaseous olefins such as those present in cracked gases by the use of the above described catalysts, the silica-alumina-zirconia masses may be disposed in a plurality of chambers and the olefins passed therethrough at relatively low temperatures of the order of 200–650° F. while employing preferably superatmospheric pressure ranging from 400–4000 pounds per square inch. The mixed phase conditions of reactants and products which may exist during contact have no deleterious influences due to the refractory character of the silica-alumina-zirconia complexes. From their chemical composition it will be obvious that these catalysts will be resistant to incidental poisoning influences of sulfur compounds which may be present in the stocks undergoing treatment and also in a large measure to basic substances such as amines, ammonia, etc. which may be present in the gases charged due to deliberate introduction or the presence of nitrogen compounds in petroleum fractions charged to cracking plants. Under the conditions of operation more usually employed with the present type of catalyst there will not be much polymerization of ethylene which may be present in the hydrocarbon gas mixtures although some mixed or cross polymerization may occur between ethylene and propylene or ethylene and butylene. When gases containing propene-butene mixtures are charged there may be some cross polymerization between these as in the case of $C_4$ mixtures of normal and isobutenes where there is some cross polymerization of iso and normal compounds. When charging gases certain only $C_3$ hydrocarbons there is obviously no cross-polymerization involved.

The following example is introduced to illustrate the type of results obtainable and the practical operation of the present process although the scope of the invention should not be considered as limited to the example of the process or the particular catalyst preparation, these being given as illustrative of the novelty and utility of the invention.

The catalyst used in the present example was prepared by suspending a purified silica gel in a solution of aluminum and zirconium salts and the corresponding hydroxides precipitated by the use of ammonia. The silica gel was prepared by dissolving 830 grams of a commercial sodium silicate in 6 liters of water and adding thereto slowly 1000 cc. of 2.5 molar hydrochloric acid solution to bring about the precipitation of hydrated silica in an alkaline medium. The hydrous silica when precipitated in this manner can be handled without difficulty in subsequent filtration and washing treatment. The precipitated gel was then filtered and washed several times with 5 liter portions of water. Subsequently the precipitated gel was treated and washed twice with 5 liter portions of water containing ¼ equivalent of hydrochloric acid. With a moderate amount of water washing the gel was rendered substantially free from alkali metal impurities and was then recovered as a filter cake. 537 grams (corresponding to 1.35 mols of $SiO_2$) of the hydrated silica was slurried in 500 cc. of water. Subsequently 13.03 grams corresponding to 0.054 mol of aluminum chloride hexahydrate ($AlCl_3.6H_2O$) dissolved in 500 cc. of water and 43.0 grams corresponding to 0.162 mol of zirconyl nitrate, dissolved in 750 cc. of water was mixed with the suspension of hydrated silica and 757 cc. of 1.006 normal hydroxide added to precipitate the alumina and zirconia in presence of the suspended silica. After thoroughly agitating the mixture it was directed to a filter where a filter cake was separated and subsequently dried at approximately 300° F. The dried material was pressed and granules of 6–10 mesh prepared. These granules were subsequently calcined at approximately 932° F. and disposed in a catalyst chamber for testing. The catalyst corresponded to approximately the following composition— $100SiO_2:2Al_2O_3:12ZrO_2$. A so-called butane-butene fraction which contained 48.8 volume per cent of butanes, 28.6% butylene and 19.3% isobutylene was contacted with the catalyst at a temperature of 330° F. under a pressure of 650 pounds per square inch. In a run of 12 hours and 40 minutes duration at a liquid space velocity of 6.9, an average of 41.2% by weight of olefin polymers was obtained. The polymer product consisted of 56.4% iso-octenes which were removed by fractionation and yielded on hydrogenation a product having an octane number of 93.3 using the motor method.

I claim as my invention:

1. A process for polymerizing olefins which comprises subjecting the same to polymerizing conditions in the presence of a polymerizing catalyst consisting essentially of a mixture of silica, alumina and zirconia.

2. A process for polymerizing olefins which comprises subjecting the same to polymerizing conditions in the presence of a polymerizing catalyst consisting essentially of a calcined mixture of precipitated silica, alumina and zirconia.

3. A process for polymerizing olefins which comprises subjecting the same to polymerizing conditions in the presence of a polymerizing catalyst consisting essentially of a mixture of a major proportion of silica and minor proportions of alumina and zirconia.

4. A process for polymerizing olefins which comprises subjecting the same to polymerizing conditions in the presence of a polymerizing catalyst consisting essentially of a calcined mixture of a major proportion of precipitated silica and minor proportions of precipitated alumina and zirconia.

5. A process for polymerizing normally gaseous olefins which comprises subjecting the same to polymerizing conditions in the presence of a polymerizing catalyst consisting essentially of a mixture of silica, alumina and zirconia.

6. A process for polymerizing normally gaseous olefins which comprises subjecting the same to polymerizing conditions in the presence of a polymerizing catalyst consisting essentially of a calcined mixture of precipitated silica, alumina and zirconia.

7. A process for polymerizing normally gaseous olefins which comprises subjecting the same to polymerizing conditions in the presence of a polymerizing catalyst consisting essentially of a mixture of a major proportion of silica and minor proportions of alumina and zirconia.

8. A process for polymerizing normally gaseous olefins which comprises subjecting the same to polymerizing conditions in the presence of a polymerizing catalyst consisting essentially of a calcined mixture of a major proportion of precipitated silica and minor proportions of precipitated alumina and zirconia.

CHARLES L. THOMAS.